United States Patent
Fujimoto et al.

(10) Patent No.: US 10,406,627 B2
(45) Date of Patent: Sep. 10, 2019

(54) RESISTANCE SPOT WELDING METHOD

(71) Applicant: NIPPON STEEL & SUMITOMO METAL CORPORATION, Tokyo (JP)

(72) Inventors: Hiroki Fujimoto, Tokyo (JP); Hatsuhiko Oikawa, Tokyo (JP); Shintaro Yamanaka, Tokyo (JP); Takashi Imamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 413 days.

(21) Appl. No.: 15/025,459

(22) PCT Filed: Dec. 18, 2014

(86) PCT No.: PCT/JP2014/083571
§ 371 (c)(1),
(2) Date: Mar. 28, 2016

(87) PCT Pub. No.: WO2015/093568
PCT Pub. Date: Jun. 25, 2015

(65) Prior Publication Data
US 2016/0228973 A1    Aug. 11, 2016

(30) Foreign Application Priority Data
Dec. 20, 2013 (JP) ................. 2013-263272

(51) Int. Cl.
*B23K 11/24* (2006.01)
*B23K 11/11* (2006.01)
*B23K 11/16* (2006.01)

(52) U.S. Cl.
CPC ............ *B23K 11/24* (2013.01); *B23K 11/11* (2013.01); *B23K 11/115* (2013.01); *B23K 11/16* (2013.01); *B23K 11/163* (2013.01); *B23K 11/241* (2013.01)

(58) Field of Classification Search
CPC ....... B23K 11/24; B23K 11/11; B23K 11/163; B23K 11/241
(Continued)

(56) References Cited

U.S. PATENT DOCUMENTS 5,294,768 A * 3/1994 Breitmeier ........... B23K 11/257
219/113
2010/0122968 A1   5/2010   Buse et al.
(Continued)

FOREIGN PATENT DOCUMENTS

CN      102858486 A     1/2013
EP      2 420 432 A1    2/2012
(Continued)

OTHER PUBLICATIONS

International Search Report for PCT/JP2014/083571 dated Mar. 17, 2015.
(Continued)

*Primary Examiner* — Thien S Tran
(74) *Attorney, Agent, or Firm* — Birch, Stewart, Kolasch & Birch, LLP

(57) ABSTRACT

By superposing a plurality of steel sheets including a high tensile steel sheet and performing pulsation conduction by an inverter DC type spot welding power supply and controlling the conduction time of the current pulses, intervals of the current pulses, that is, conduction idle time, and weld current applied at the current pulses in a variable manner, the optimum weld conditions are obtained. For resistance spot welding of the hot stamped steel sheet, resistance spot welding with a minimum weld current of a second pulsation step higher than the maximum weld current at a first pulsation step is used to suppress the occurrence of outer spatter and inner spatter and secure a broad suitable current range even if using an inverter DC power supply.

18 Claims, 7 Drawing Sheets

(58) Field of Classification Search
USPC .............. 219/81, 86.7, 91.22, 100, 108, 114, 219/130.51
See application file for complete search history.

(56) References Cited

U.S. PATENT DOCUMENTS

| | | | | |
|---|---|---|---|---|
| 2012/0129006 | A1* | 5/2012 | Kanai | B23K 11/115 428/683 |
| 2013/0087533 | A1 | 4/2013 | Hou | |
| 2013/0088037 | A1 | 4/2013 | Schurter et al. | |
| 2014/0152053 | A1* | 6/2014 | Watanabe | B62D 25/02 296/193.06 |
| 2014/0367368 | A1* | 12/2014 | Yang | B23K 11/0033 219/91.22 |

FOREIGN PATENT DOCUMENTS

| | | | | | |
|---|---|---|---|---|---|
| GB | 1023305 | A | | 3/1966 | |
| GB | 2468011 | A | * | 8/2010 | ........... B23K 11/115 |
| GB | 2468011 | A | | 8/2010 | |
| JP | 5-293669 | A | | 11/1993 | |
| JP | 2003-236674 | A | | 8/2003 | |
| JP | 2006-181621 | A | | 7/2006 | |
| JP | 2010-188408 | A | | 9/2010 | |
| JP | 2010-207909 | A | | 9/2010 | |
| JP | 2010-247215 | A | | 11/2010 | |
| JP | 2010247215 | A | * | 11/2010 | |
| JP | 4728926 | B2 | | 7/2011 | |
| JP | 2012-30274 | A | | 2/2012 | |
| JP | 2012-40910 | A | | 3/2012 | |
| JP | 2012-232327 | A | | 11/2012 | |
| JP | WO 2013008515 | A1 | * | 1/2013 | ............. B62D 25/02 |
| KR | 10-2012-0001126 | A | | 1/2012 | |
| SU | 1197796 | A | | 12/1985 | |

OTHER PUBLICATIONS

ISO 18278-2, "Resistance welding—Weldability—Part 2: Alternative procedures for the assessment of sheet steels for spot welding", total 27 pages, Nov. 1, 2004.

Laurenz et al., "Influence of the furnace dwell time of metallically coated hot forming steel on the suitability for resistance spot, projection and arc stud welding,", SchweissenSchneiden, Oct. 212, vol. 64, No. 10, pp. 654-661.

Written Opinion of the International Searching Authority for PCT/JP2014/083571 (PCT/ISA/237) dated Mar. 17, 2015.

* cited by examiner

RESISTANCE SPOT WELDING METHOD

TECHNICAL FIELD

The present invention relates to a resistance spot welding method, more particularly relates to a resistance spot welding method using an inverter DC power supply.

BACKGROUND ART

Car bodies are mainly assembled by joining press-formed steel sheets by resistance spot welding. In the resistance spot welding used in the assembly of car bodies, both securing a nugget size corresponding to the sheet thickness and suppressing the occurrence of spatter are sought.

In general, for example, a range defined by a current value giving a $4\sqrt{t}$ ("t" shows the sheet thickness (mm)) or other reference nugget size as a lower limit (below, referred to as the "lower limit current" or "$4\sqrt{t}$ current") and a current value where spatter occurs as an upper limit (below, referred to as "upper limit current" or "spatter current") (below, referred to as a "suitable current range") is considered an important indicator relating to spot welding of steel sheets. The lower limit current and the upper limit current are measured in the ideal state at the test piece.

Spatter includes inner spatter (the phenomenon of metal of the base material melted by the welding scattering from the superposed surfaces of the steel sheets) and outer spatter (the phenomenon of the base material metal melted by the welding scattering from the contact surfaces of the steel sheets and electrodes). In both cases, the surface quality is lowered by scattering and sticking to the car body. Further, sticking to the moving parts of a welding robot causes poor operation of the equipment. Furthermore, the outer spatter remaining in needle shapes on the surface of a spot welded part becomes a cause of damage to the wire harnesses of automobiles etc., so a grinder has to be used for grinding away the spatter. For this reason, it is required that in resistance spot welding, inner spatter and outer spatter be avoided and a predetermined nugget size be secured.

The lower limit current is evaluated in the ideal state at the test piece level. However, in actual assembly of a car body, due to wear of the electrodes, shunting to existing welding points, clearance between pressed parts, and other various external factors, even if welding an actual car body by a current value giving $4\sqrt{t}$ at the test piece level, the nugget size will sometimes fall below $4\sqrt{t}$. For this reason, on a mass production line, it is necessary to set a current value of 1.0 kA or more, preferably 1.5 kA or more, higher than the current giving $4\sqrt{t}$ at the test piece level as a realistic lower limit current value. Therefore, when desiring to stably obtain a $4\sqrt{t}$ or more nugget size on a mass production line without spatter occurring, the suitable current range in evaluation at the test piece level is required to be 1.0 kA or more, preferably 1.5 kA or more. This is because if a predetermined suitable current range cannot be secured at the test piece level, it is necessary to set the current value at a current where spatter occurs to stably secure a $4\sqrt{t}$ nugget size in spot welding at the actual worksite where there are many outside disturbances.

In recent years, in assembly of automobiles, resistance spot welding machines of the inverter DC type instead of the single-phase AC type have increasingly been used. The inverter DC type enables the transformer to be made smaller, so there is the merit of enabling a robot with a small carrying load to carry it, so this is particularly often used on automated lines.

The inverter DC type does not turn the current on and off like the conventionally used single-phase AC system but continuously applies current, so the heat generation efficiency is good. For this reason, it is reported that even in the case of a zinc-plated material of thin sheet soft steel where formation of a nugget is difficult, a nugget is formed from a low current and the suitable current range is broader than the single-phase AC system.

On the other hand, if welding high tensile steel sheet, where formation of a nugget is easy, by an inverter DC power supply, conversely to a soft steel sheet, the current where spatter occurs is low. That is, sometimes the upper limit current becomes lower and therefore the suitable current range becomes remarkably narrower. In resistance spot welding, as shown in FIG. 1, a single-stage conduction system performing conduction just a single time is often used in resistance spot welding of cars. However, with the single-stage conduction system, the suitable current range becomes narrower, so a conduction system which broadens the suitable current range has been reported.

PLT 1, as shown in FIG. 2, discloses a method employing a two-stage conduction system using preliminary conduction to improve the fit between contact surfaces of the steel sheets, then perform the main conduction so as to suppress the occurrence of spatter in resistance spot welding of high tensile steel sheets.

PLT 2, as shown in FIG. 3, discloses a method employing a conduction system using preliminary conduction to improve the fit between contact surfaces of the steel sheets, then stopping the current, then using main conduction so as to suppress the occurrence of spatter in resistance spot welding of high tensile steel sheets.

PLT 3, as shown in FIGS. 4 and 5, has a three-stage conduction process. That is, it is comprised of a first step of forming a nugget as a preliminary conduction step, a second step of making the current fall after the preliminary conduction and increasing a corona bond area around the nugget, and a third step of running a current larger than the preliminary conduction current after the second step and enlarging the nugget size as a main conduction step. In this method, due to the preliminary conduction, the fit between the contact surfaces of the steel sheets is improved, then the current is lowered, then main conduction of a certain current or main conduction of a pulsation shape is performed so the occurrence of spatter at the resistance spot welding of the high tensile steel sheet is suppressed. Furthermore, PLT 3 discloses making the third step a pulsation conduction system to thereby make the effect of expansion of the conduction diameter greater and suppress the occurrence of spatter compared with the continuous conduction system.

PLT 4, as shown in FIG. 6, discloses a method of using resistance spot welding repeating an up-down change of current while raising the current value to suppress the occurrence of spatter in resistance spot welding of high tensile steel sheets.

NPLT 2, as shown in FIG. 7, discloses a resistance spot welding method for thickness 1.5 mm or more steel sheets which comprises conduction for 120 msec (six cycles at 50 Hz) or more and idling for 40 msec (two cycles at 50 Hz) repeated three times or more.

CITATION LIST

Patent Literature

PLT 1. Japanese Patent Publication No. 2010-188408A
PLT 2. Japanese Patent Publication No. 2003-236674A PLT 3. Japanese Patent Publication No. 2010-207909A
PLT 4. Japanese Patent Publication No. 2006-181621A Nonpatent Literature NPLT 1. LAURENZ, et al: SchweissenSchneiden, 64-10 (2012), 654-661.
NPLT 2. ISO 18278-2 Resistance Welding-Weldability—Part 2. Alternative procedure for the assessment of sheet steels for spot welding

SUMMARY OF INVENTION

Technical Problem

In recent years, as steel sheet for automobiles, use of high tensile steel sheet has been growing so as to lighten the weight of car bodies and improve collision safety. Further, application of hot stamping (method of heating steel sheet to a quenchable temperature to austenize it, then press forming it and simultaneously cooling it in the mold to temper it) has been growing. Most press-formed parts of ultra high strength steel sheet with a tensile strength of the 1180 to 2000 MP class are produced by hot stamping.

The surface of a steel sheet used for hot stamping is sometimes nonplated and sometimes zinc-based plated, aluminum-based plated, or otherwise surface-treated to prevent formation of iron scale when heated to a high temperature. Note that, a hot stamped steel sheet is in many cases not a flat sheet but a shape. In this Description, high tensile steel sheet which is hot stamped will be referred to as "hot stamped steel sheet" including the case of shapes. Further, in the same way, zinc-based plated steel sheet, aluminum-based plated steel sheet, or such steel sheet further coated on the surface which is hot stamped will be referred to as "surface-treated hot stamped steel sheet".

If welding hot stamped steel sheets by a resistance spot welding machine with an inverter DC power supply, sometimes spatter occurs at a lower current value than the case of use of a single-phase AC power supply conversely to a soft steel sheet and the phenomenon of the suitable current range becoming narrower occurs. NPLT 1, for example, reports that this phenomenon occurs in resistance spot welding of aluminum-plated hot stamped steel sheet.

In particular, surface-treated hot stamped steel sheet becomes more susceptible to inner spatter along with outer spatter and remarkably narrower in suitable current range with an inverter DC power supply. For this reason, the nugget size obtained without the occurrence of spatter also becomes smaller.

The causes are not elucidated, but inner spatter may occur as follows: At the spot welded part, there is a press bonded part (corona bond part) pressed by the electrodes around the melted and solidified nugget in which the molten metal is sealed. If the inside pressure of the molten metal exceeds the outside pressure acting on the corona bond part, it no longer becomes possible to seal in the molten metal and inner spatter will occur. In general, if the press bonded part becomes narrower, the internal pressure will no longer be able to be withstood and spatter will easily occur. For this reason, to suppress the occurrence of spatter, it is necessary to improve the fit between one steel sheet and the other steel sheet and widen the press bonded part and to avoid sudden heat generation so that the nugget gradually grows.

The surface-treated hot stamped steel sheet has an oxide film mainly comprised of metal derived from the plating at the steel sheet surface (for example, if zinc-based plating, zinc, while if aluminum-based plating, aluminum) or an oxide film derived from the surface coating. For this reason, compared with bare steel sheet, the position where current flows at the steel sheet surface becomes local and increased current density is apt to cause rapid generation of heat. On the other hand, in the hot stamping process, alloying of the plating and steel proceeds and the melting point of the alloy formed at the steel sheet surface also becomes a high temperature close to iron. For this reason, compared with steel sheet provided with a plating film before heating, the contact parts of the steel sheets soften, so expansion of the conduction path is suppressed. In particular, the inverter DC system is higher in heat generation efficiency compared with the single-phase AC system due to the continuous input of current, so the formation of the nugget at the initial stage of conduction is extremely fast. For this reason, it is believed the growth of the press bonded part around the nugget cannot be kept up with and the molten metal can no longer be sealed in, so inner spatter occurs.

Further, the cause of occurrence of outer spatter is similar. Due to the effect of the oxide film etc., the resistance becomes higher at the contact parts of the steel and electrodes and the amount of heat generation becomes larger. In addition to this, the inverter DC system is a continuous conduction system. There is no current idle time such as with the single-phase AC system, so the cooling efficiency by the copper electrode becomes hard to obtain. For this reason, it is believed that the nugget easily grows in the sheet thickness direction, the melted part reaches up to right below the outermost layer of the steel sheet, and outer spatter occurs.

The method of PLT 1 is a resistance spot welding method of high tensile steel sheet. With surface-treated hot stamped steel sheet, the current value able to be given without causing spatter in the initial first conduction is low, but the effect of suppression of spatter by widening the conduction path and lowering the current density is not sufficient. For this reason, if raising the current in the second half of conduction, cases are recognized where inner spatter and and outer spatter occur. This is insufficient for securing a suitable current range.

The method of PLT 2, in the same way as in PLT 1, is lower in current value able to be given in the initial first conduction without causing spatter in surface-treated hot stamped steel sheet. Compared with PLT 1, the upper limit current rises, but if raising the current in the second stage, cases of occurrence of inner spatter are observed. This method was still insufficient for securing a suitable current range.

The method of PLT 3 only shows examples of single-phase AC spot welding machines. The case of inverter DC spot welding machines is not confirmed. In addition, in the examples, the case of 980 MPa high tensile steel is explained, but the case of surface-treated hot stamped material susceptible to spatter is not explained. The inventors used an inverter DC spot welding machine to investigate the effect of the art of PLT 3 in surface-treated hot stamped steel sheet. As a result, it was not possible to obtain a suitable current range from the current where the nugget size becomes $4\sqrt{t}$ to where spatter occurs of 1.5 kA or more. The effect was still insufficient. This could not be directly applied to resistance welding of surface-treated hot stamped steel sheet susceptible to surface spatter. Furthermore, this is even truer in resistance welding using an inverter DC power supply when the current density becomes higher compared with a single-phase AC power supply system.

The conduction system described in PLT 4 has the effect of broadening the suitable current range up to steel materials with a tensile strength of the 980 MPa class, but in higher strength surface-treated hot stamped steel sheet, inner spatter and outer spatter easily occur at the time of the second or third upward change in current. This conduction pattern is not suitable for welding hot stamped materials.

With the conduction system disclosed in NPLT 2, even when the conduction is the shortest, it is 6 cycles (120 msec). In surface-treated hot stamped steel sheet, inner spatter occurs with a conduction time shorter than six cycles, so with this conduction system, the upper limit current cannot be raised. Therefore, if shortening the conduction time in the pulsation, the upper limit current will rise, but the drop in heat generation efficiency will cause the lower limit current to rise and as a result the suitable current range will not be able to be broadened. For this reason, this method is also not suitable.

The present invention has as its object to apply an inverter DC power supply to lap resistance spot welding of surface-treated hot stamped steel sheets and hot stamped steel sheets. That is, it has as its object to provide an inverter DC power supply system resistance spot welding method which can suppress the occurrence of outer spatter and inner spatter and can secure a broad suitable current range.

Solution to Problem

The inventors used an inverter DC type spot welding power supply, engaged in studies using 1500 MPa class surface-treated hot stamped steel sheets, and thereby obtained the following discoveries.

(a) The inventors discovered that by employing the pulsation conduction system, there is the effect of repeated cooling and heating, so by employing the pulsation conduction system for the inverter DC system, it is possible to ease the rise in temperature due to the high heat generation efficiency. That is, the inventors discovered that by controlling the conduction time and idle time in pulsation conduction, it is possible to control the rise in temperature at the time of welding and control the speed of growth of the nugget. Due to this, it is possible to suppress sudden nugget growth.

(b) At the same time, the inventors discovered that the growth of the corona bond could also be controlled by the pressing force of the electrodes and current control in pulsation conduction. That is, by the pulsation step, it is possible to make the contact surfaces vibrate by heat expansion and contraction, so while the effect is particularly remarkable in surface-treated hot stamped materials, the high melting point oxide layer is effectively broken and a plurality of conduction points can be formed at the contact interfaces between the electrodes and steel sheets and between one steel sheet and another steel sheet (region where current actually flows) and it is possible to suppress the rise in current density at the contact interface and suppress the rapid growth of the nugget. Due to these actions, it is possible to suppress the occurrence of inner spatter and outer spatter while improving the fit in a short time.

(c) The inventors discovered that by suitably controlling the speed of growth of the nugget and the speed of growth of the corona bond, it is possible to eliminate the occurrence of spatter and increase the nugget size. That is, the inventors discovered that it is possible to suppress a drop in the upper limit current and secure a suitable current range.

(d) Due to the thicknesses, hardnesses (tensile strengths), shapes, and other factors of the superposed steel sheets, the optimum conduction pattern changes. When welding by the inverter DC system, it becomes necessary to meet various conditions. For this reason, the inventors discovered that by controlling the conduction time, applied current, pulse intervals, etc. for each pulse, it is possible to set welding conditions simply and swiftly and possible to perform resistance spot welding well.

(e) For example, the inventors discovered that when spot welding the same thicknesses of surface-treated hot stamped steel sheets, two-stage pulsation conduction may be performed in the following way. That is, if the first pulsation step repeating conduction and idling is performed for the purpose of improving the fit of the contact surfaces of the steel sheets and expanding the conduction path, then the second pulsation step of repeating conduction and idling by a higher current than the first pulsation step is performed for the purpose of enlarging the nugget size, it is possible to suppress the occurrence of inner spatter and outer spatter while performing resistance spot welding with a wide, stable suitable current range. This is believed to because at the first pulsation step, the corona bond grows and simultaneously the nugget is formed. Further, it is considered possible to conduct the main conduction in the second pulsation step and grow the nugget large to obtain a predetermined nugget size.

The present invention was made based on this discovery and has as its gist the following resistance spot welding methods:

(1) A resistance spot welding method welding a plurality of steel sheets including a high tensile steel sheet superposed, in which the resistance spot welding method, the conduction system is pulsation conduction using an inverter DC welding power supply, and, in the plurality of current pulses forming the pulsation conduction, at the respective current pulses, the conduction time, the intervals of the current pulses defined as the conduction idle time, and the weld currents applied by the current pulses are variably controlled.

(2) The resistance spot welding method according to (1) which has one or more pulsation steps of a group of current pulses by which the relationship between the conduction time and the conduction idle time and the weld current can be expressed uniformly in a consecutive plurality of the current pulses.

(3) The resistance spot welding method according to (2) which has a plurality of the pulsation step and where, in an initial pulsation step of a first pulsation step and a succeeding second pulsation step, a minimum weld current at the second pulsation step is higher than a maximum weld current at the first pulsation step.

(4) The resistance spot welding method according to (3) wherein, in the first pulsation step, there are two or more current pulses, a conduction time of a current pulse is respectively 5 to 60 msec, and a conduction idle time is 5 to 60 msec, in the second pulsation step, there are three or more current pulses, a conduction time of a current pulse is respectively 5 to 60 msec, and a conduction idle time is 5 to 60 msec, and a conduction idle time between the first pulsation step and the second pulsation step is 5 to 120 msec.

(5) The resistance spot welding method according to (3) or (4) wherein a weld current at the first pulsation step is 5.0 to 14.0 kA, while a weld current at the second pulsation step is 5.0 kA to 16.0 kA.

(6) The resistance spot welding method according to any one of (3) to (5) wherein a minimum weld current at the second pulsation step is 0.5 kA or more higher than a maximum weld current at the first pulsation step.

(7) The resistance spot welding method according to any one of (3) to (6) wherein a weld current at the first pulsation step is a constant value, and a weld current at the second pulsation step is a constant value.

(8) The resistance spot welding method according to any one of (1) to (7) wherein a surface of the high tensile steel sheet is covered by a zinc-based coating film or an aluminum-based coating film.

(9) The resistance spot welding method according to any one of (1) to (8) wherein the high tensile steel sheet is a hot stamped steel sheet.

Advantageous Effects of Invention

According to the present invention, in resistance spot welding of high tensile steel sheets superposed, even if using an inverter DC power supply, it is possible to suppress the occurrence of outer spatter and inner spatter while enlarging the nugget size in resistance spot welding. Therefore, if using the resistance spot welding method according to the present invention, even with steel sheets extremely susceptible to spatter such as surface-treated hot stamped steel sheets, efficient, stable resistance spot welding becomes possible.

DESCRIPTION OF EMBODIMENTS

Figure 1:
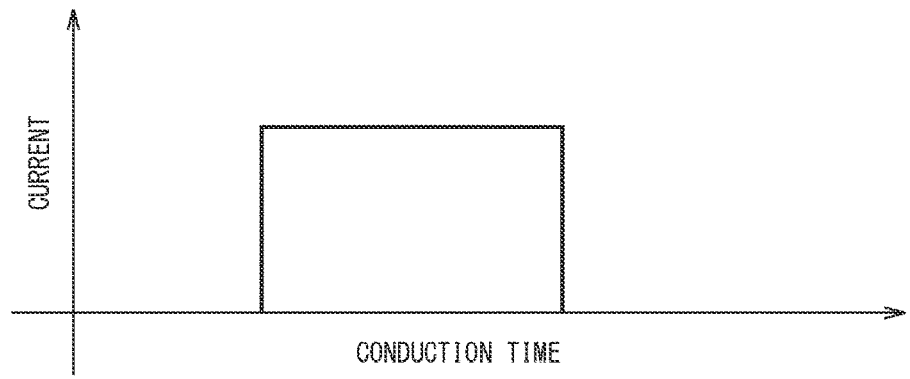
FIG. 1. is an explanatory view schematically showing a single-stage conduction system performing conduction just a single time.
Figure 2:
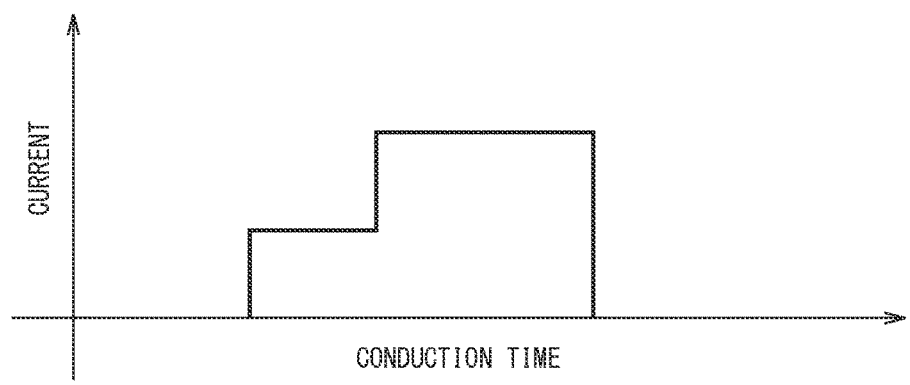
FIG. 2 is an explanatory view schematically showing a conduction system in PLT 1.
Figure 3:
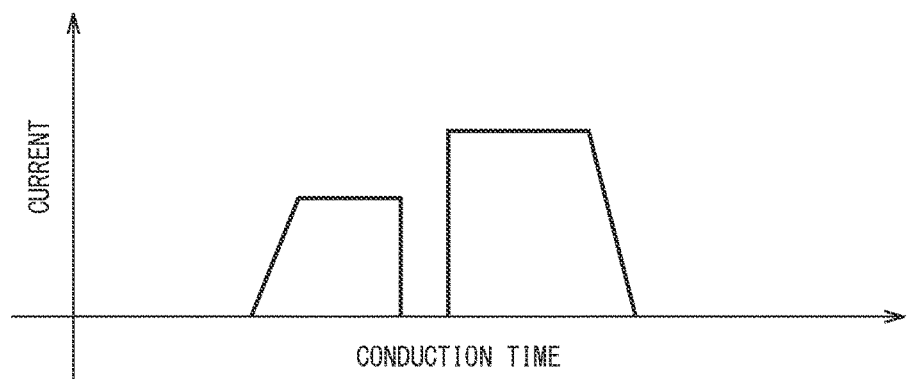
FIG. 3 is an explanatory view schematically showing a conduction system in PLT 2.
Figure 4:
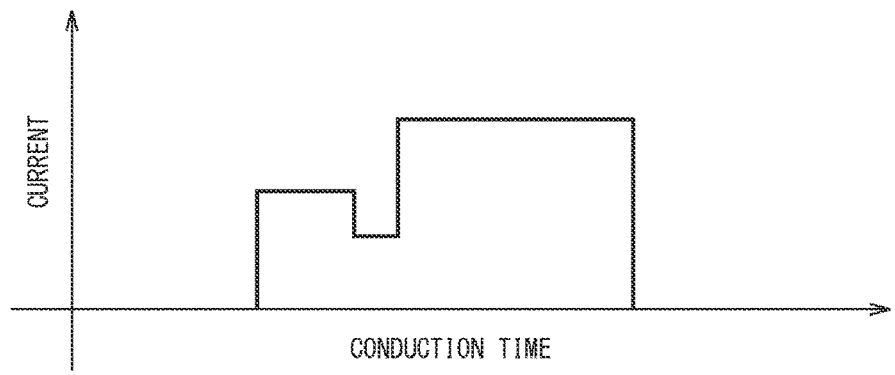
FIG. 4 is an explanatory view schematically showing a conduction system in PLT 3.
Figure 5:
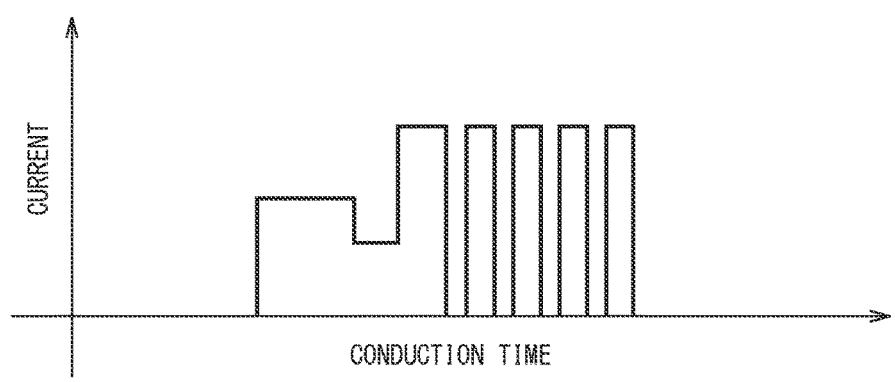
FIG. 5 is an explanatory view schematically showing a conduction system in PLT 3.
Figure 6:
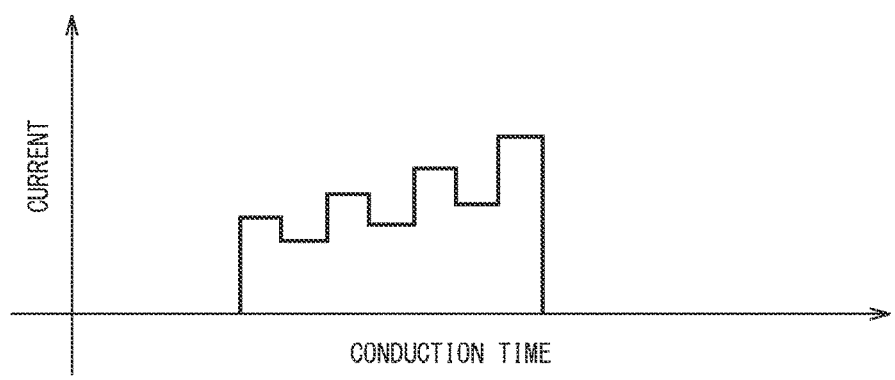
FIG. 6 is an explanatory view schematically showing a conduction system in PLT 4.
Figure 7:
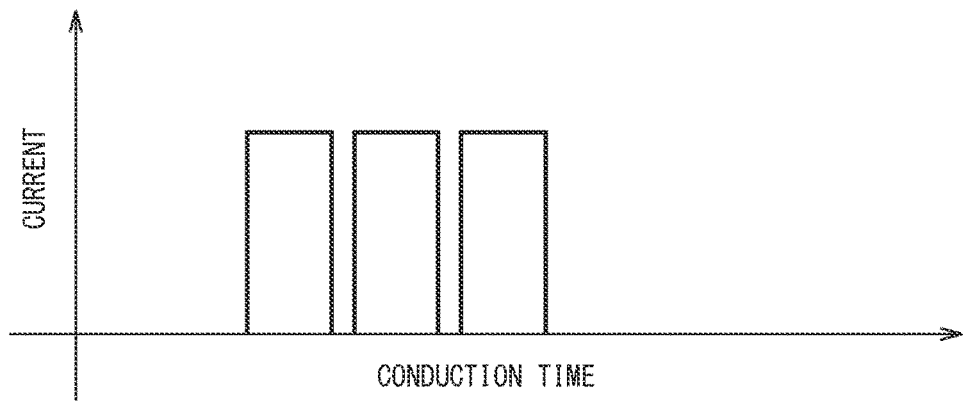
FIG. 7 is an explanatory view schematically showing a conduction system in NPLT 2.

Below, embodiments of the present invention will be explained with reference to the example of the resistance spot welding made wide use of in assembly of car bodies.

The combination of sheets covered by the present invention is comprised of two or more steel sheets, at least one of which is a 590 MPa class or more high tensile steel sheet, superposed. In normal assembly of car bodies, two or three steel sheets superposed are welded by resistance spot welding.

The type of the high tensile steel sheet is not particularly limited. For example, the invention can be applied to precipitation strengthened steel sheet, DP steel sheet, TRIP (work induced transformed) steel sheet, hot stamped steel sheet, or other tensile strength 590 MPa or more high tensile steel sheet. The resistance spot welding method according to the present invention exhibits its effect by being performed on combinations of sheets including tensile strength 980 MPa or more high tensile steel sheet. To obtain the action and effect of the present invention more, the method is preferably applied to a combination of sheets including a high tensile steel sheet with a tensile strength of 1200 MPa or more, more preferably is applied to a combination of sheets including a high tensile steel sheet with a tensile strength of 1500 MPa or more.

Further, the high tensile steel sheet may be cold rolled steel sheet or may be hot rolled steel sheet. Furthermore, the presence or absence of plating is not an issue. Plated steel sheet is acceptable while nonplated steel sheet is also possible. Further, in the case of plated steel sheet, the type of plating is also not particularly limited.

As explained above, the present invention is effective for various high tensile steel sheets, but the effect of the present invention is particularly exhibited in surface-treated hot stamped steel sheet with a narrow suitable current range. The surface-treated hot stamped steel sheet is formed on its surface with a solid solution of intermetallic compounds and iron by an alloying reaction between a zinc-based (pure Zn, Zn—Fe, Zn—Ni, Zn—Al, Zn—Mg, Zn—Mg—Al, etc.) or aluminum-based (Al—Si etc.) plating film and the steel of the base material. Furthermore, these surfaces are formed with an oxide layer mainly comprised of zinc or aluminum. Further, sometimes the surface of the film mainly comprised of intermetallic compounds of iron and aluminum is formed with a film mainly comprised of zinc oxide for improving the corrosion resistance. As explained above, the surface-treated hot stamped steel sheet includes such oxides at its surface, so it is believed that inner spatter and outer spatter easily occur. In the case of a single-stage conduction system using an inverter DC power supply, the suitable current range is often less than 1 kA.

The thickness of the high tensile steel sheet is not particularly limited. In general, the thickness of the steel sheet used in auto parts or car bodies is 0.6 to 3.2 mm. The resistance spot welding according to the present invention has sufficient effect in this range.

The welding machine used in the present invention is an inverter DC system resistance spot welding machine. Resistance spot welding machines include the single-phase AC system and inverter DC system. When welding a combination of sheets including a hot stamped steel sheet or other high tensile steel sheet, with the single-phase AC system, it is harder for spatter to occur even at a high current value compared with the inverter DC system. On the other hand, with the inverter DC system, while a high heat generation efficiency is exhibited, inner spatter and outer spatter occur more easily with a low current value. For this reason, the inverter DC system is narrower in suitable current range. On an actual site, the applicability is inferior in the case of welding combinations of sheets including a hot stamped steel sheet or other high tensile steel sheet. The resistance spot welding method according to the present invention is predicated on solution of the problem of inverter DC type spot welding.

The pressing mechanism in the resistance spot welding may be pressing by a servo motor or pressing by air. Further, for the shape of the gun, a stationary type, C-type, or X-type may be used. The pressing force at the time of welding is not particularly limited. During the resistance spot welding, the pressing force may be constant or the pressing force may be changed at the different steps. The pressing force is preferably 200 to 600 kgf.

The electrodes in the resistance spot welding are also not particularly limited. DR type electrodes with tip diameters of 6 to 8 mm may be mentioned. As the most representative example, there are DR type electrodes with tip diameters of 6 mm and tip R40 mm. For the electrode material, either chrome copper or aluminum dispersed copper electrodes may be used, but from the viewpoint of prevention of fusing and outer spatter, aluminum dispersed copper is preferable.

For the conduction system used in the present invention, the pulsation conduction system is employed. "Pulsation conduction" means application of a pulse-like constant current while pressing one location in resistance spot welding and is comprised of one or more current pulses. In the present invention, an inverter DC power supply is used, so the current pulse (below, also simply referred to as a "pulse") becomes a rectangular or trapezoidal pulse waveform.

Figure 8A:
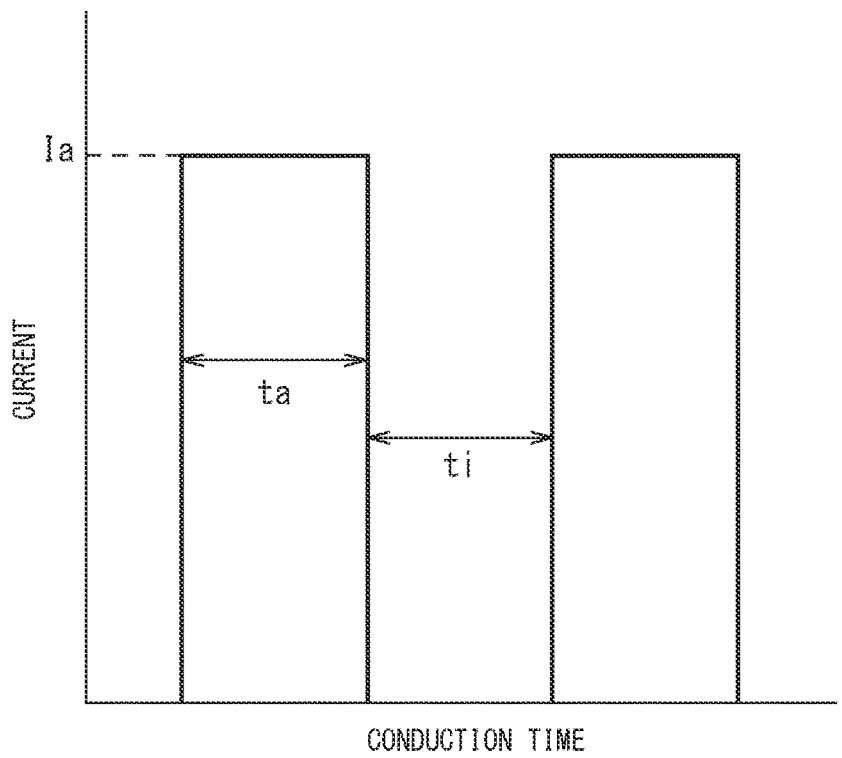
FIG. 8A is an explanatory view of a current pulse in pulsation conduction.
Figure 8B:
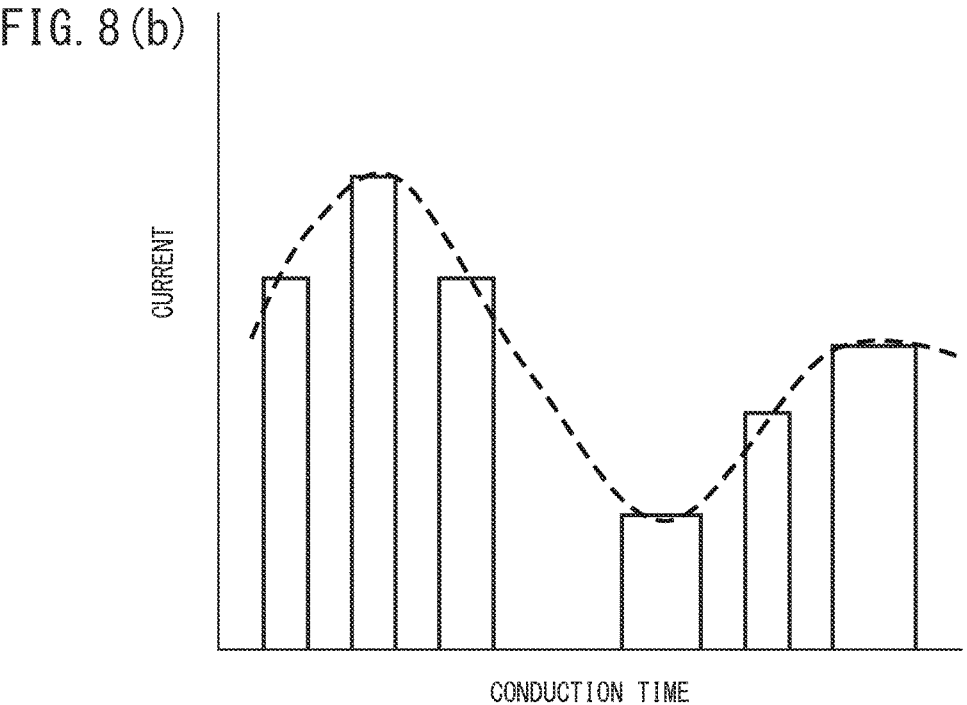
FIG. 8B is an explanatory view schematically showing the relationship between a conduction time and current in the present invention and showing the case where the current pulse is freely changed.

FIG. 8A shows a typical pulse waveform of a rectangular pulse waveform. The abscissa shows the time, while the ordinate shows the weld current applied. Ia corresponding to the height of the rectangle is the applied weld current. The ta corresponding to the width of the rectangle is the conduction time of the pulse, while the interval ti with the adjoining pulse is the conduction idle time of pulses, the so-called interval. In the welding method in the present invention, the conduction time, conduction idle time, and weld current can be variably controlled for each pulse. By controlling these, it is possible to realize a conduction pattern suitable for the welding conditions. FIG. 8B is an example of the changes in pulse when the weld current draws any curve. Further, the shape of the pulses is not limited to a rectangle. The rising part and the trailing part may also be slanted with respect to time. That is, they may be trapezoidal or in extreme cases may be triangular.

Figure 8C:
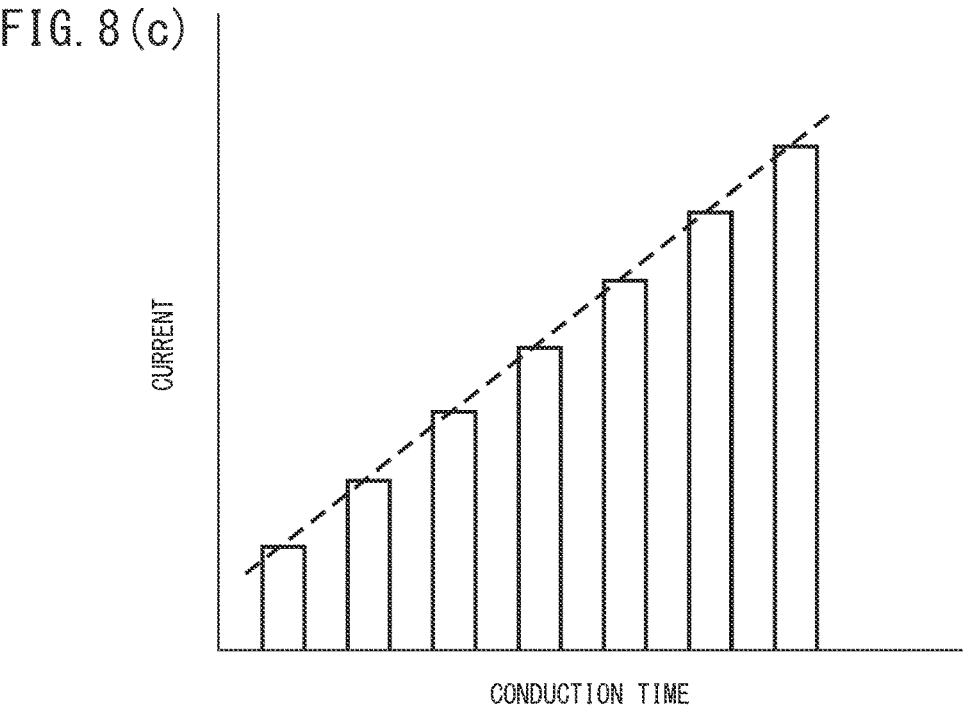
FIG. 8C is an explanatory view schematically showing the relationship between a conduction time and current in the present invention and showing the case where the current pulse changes simulating a linear function of time.
Figure 8D:
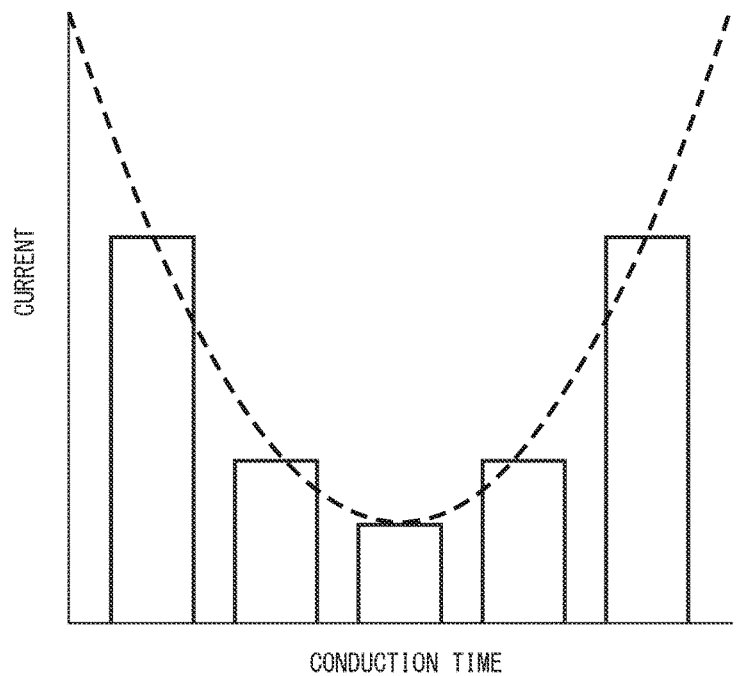
FIG. 8D is an explanatory view schematically showing the relationship between a conduction time and current in the present invention and showing the case where the current pulse changes simulating a quadratic function.

In the present invention, a "pulsation step" means a group of current pulses where the relationship between the conduction time and conduction idle time and the weld current can be expressed uniformly in a consecutive plurality of current pulses. For example, when a plurality of consecutive pulses are constant in conduction time ta and idle time ti and the weld current of a pulse becomes a function of time, the group of current pulses which can be expressed by that function becomes a single pulsation step. FIG. 8C shows an example of the pulsation step where the conduction time ta and idle time ti are constant and the weld current of a pulse becomes a linear function of time. FIG. 8D shows an example of the pulsation step where the conduction time ta and idle time ti are constant and the weld current of a pulse becomes a quadratic function of time. That is, if the relationship between the pulses can be uniformly expressed, the group of pulses can be referred to as a "pulsation step".

Figure 8E:
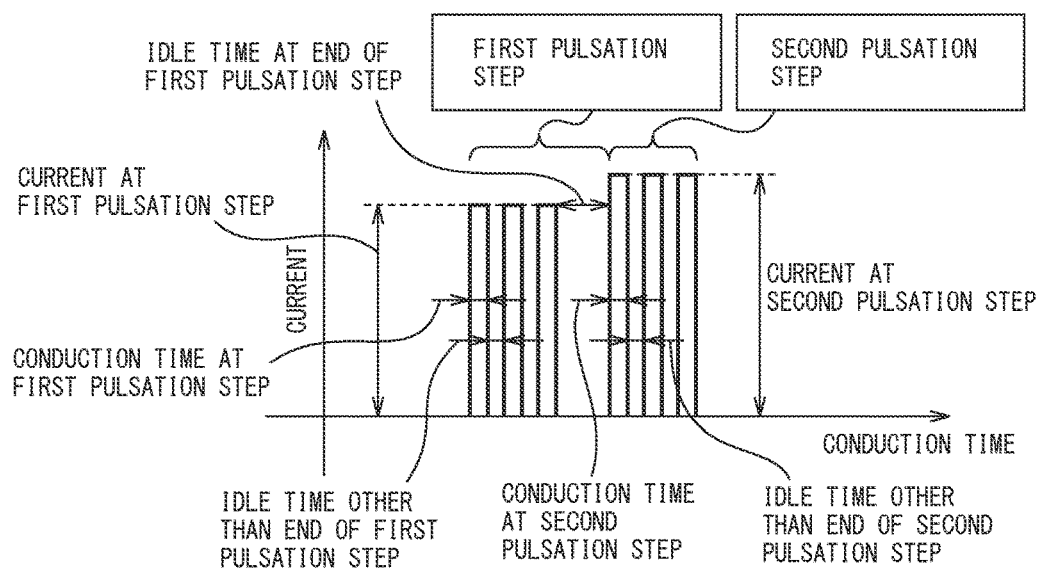
FIG. 8E is an explanatory view schematically showing the relationship between a conduction time and current in one aspect of the present invention.

FIG. 8E is an explanatory view schematically showing a conduction pattern discovered by the inventors suitable for when welding general hot stamped steel sheet and surface-treated hot stamped steel sheet by resistance spot welding. This resistance spot welding method has a plurality of pulsation steps. It is provided with an initial step of a first pulsation step and a succeeding second pulsation step. The minimum weld current in the second pulsation step is higher than the maximum weld current in the first pulsation step. Note that, the "maximum weld current in the first pulsation step" means the maximum value of the weld current of the pulses in the first pulsation step. In the same way, the "minimum weld current in the second pulsation step" means the the minimum value of the weld current of the pulses in the second pulsation step. Below, each step will be explained in detail.

In the pulsation step, the conduction time, idle time, and number of pulses can be adjusted by the type of the material, sheet thickness, and combination of sheets. In the resistance spot welding method of the present invention, first, the first pulsation step can be used to make use of the cooling efficiency of the electrodes while improving the fit of the contact surfaces of the steel sheets in a short time and to expand the press bonded part.

In addition, in the case of a zinc-plated or aluminum-plated surface-treated hot stamped steel sheet with an outermost layer covered by a zinc oxide or other high electrical resistance film, if using the inverter DC power supply for continuous conduction, the oxide layer at the steel sheet surface is locally broken and the part where the oxide layer is broken remarkably rises in current density whereby rapid melting rises and spatter easily occurs. Due to the first pulsation step where conduction and idling are repeated, the contact surfaces can be made to vibrate by heat expansion and contraction, so the high melting point oxide layer can be effectively broken. Due to this, it is possible to form a plurality of conduction points at the contact interfaces between the electrode and steel sheet and between one steel sheet and another steel sheet (region where current actually flows) and it is possible to suppress the rise in current density at the contact interface and suppress the rapid growth of the nugget. Due to these actions, it is possible to suppress the occurrence of inner spatter and outer spatter while improving the fit in a short time.

The conduction time per pulse in the first pulsation step is preferably 5 to 60 msec. If the conduction time is less than 5 msec, the heating time is short and the heat generation not sufficient, while if over 60 msec, the heating time is too long and the rate of occurrence of outer spatter and inner spatter is liable to rise. The conduction time is more preferably 15 msec or more. Further, the conduction time is more preferably 45 msec or less, still more preferably 25 msec or less.

The weld current in the first pulsation step is preferably 5.0 to 14.0 kA. Normally, if the conduction time in pulsation increases, the upper limit current falls. The weld current is preferably suitably adjusted so that spatter does not occur in the first pulsation step in the range of 5.0 to 14.0 kA from the balance with the conduction time. The weld current is preferably set to a range of $I_1$-3.0 to $I_1$-0.2 kA when making the upper limit current in the first pulsation step $I_1$ (kA). Further, to simplify the setting of the current control apparatus of the spot welding machine, it is preferable to set the weld current in the first pulsation step at a constant value.

The conduction idle time in the first pulsation step (below, also referred to as the "idle time") is preferably 5 to 60 msec. If the idle time is less than 5 msec, the idling becomes short and cooling insufficient so inner spatter and outer spatter are liable to occur. On the other hand, if the idle time is over 60 msec, the cooling efficiency becomes too great and the nugget shape in the later explained second pulsation step is liable to become insufficient. The idle time is more preferably 15 msec or more. Further, the idle time is still more preferably 45 msec or less, even more preferably 25 msec or less.

Figure 9:
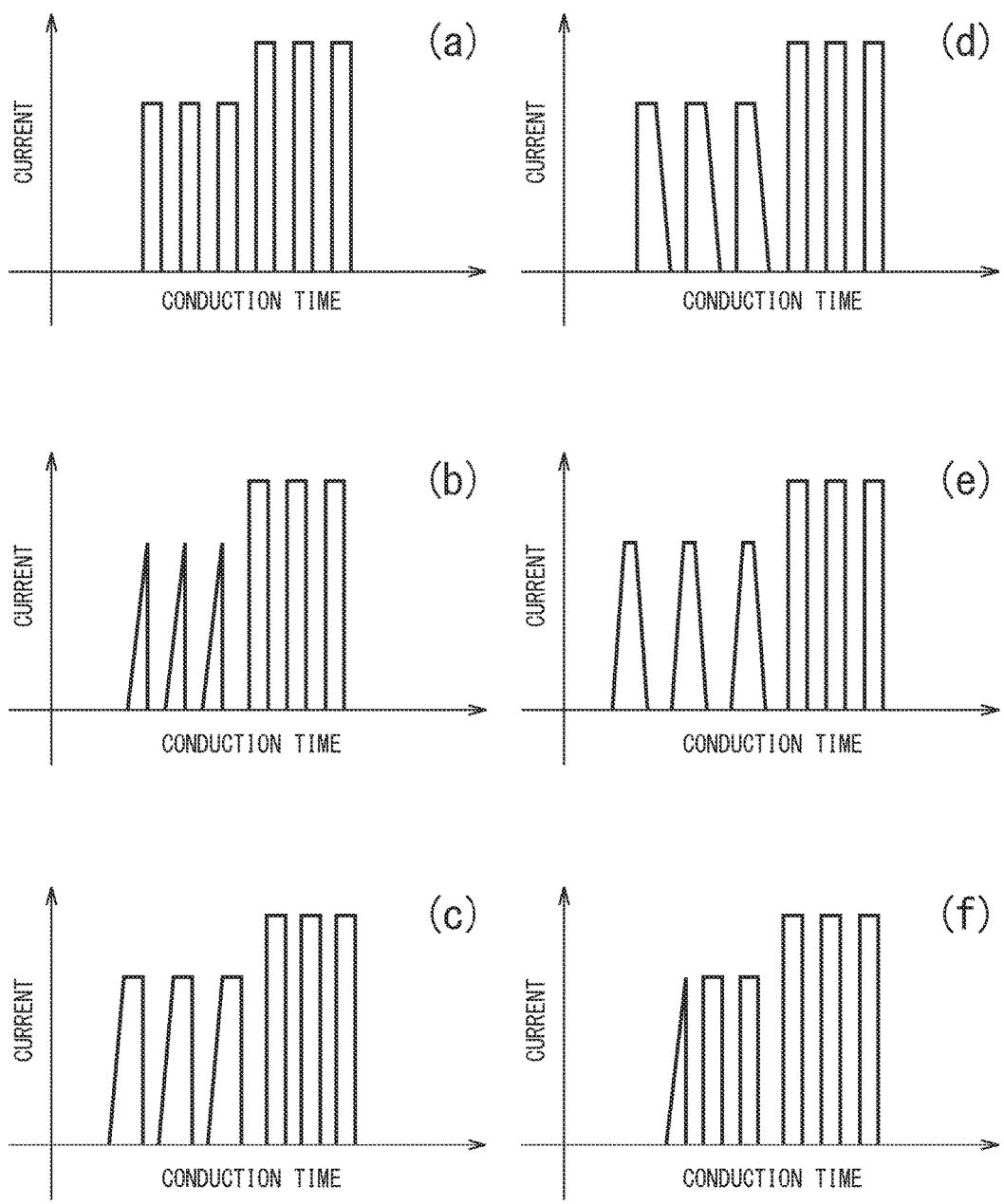
FIG. 9 is an explanatory view schematically showing a conduction system in the first pulsation step of the present invention.

The current waveform at the first pulsation step is preferably a rectangular wave shape with a constant conduction time and idle time, but may also be a waveform including an up slope (rising part slanting to increase with respect to time) or down slope (trailing part slanting to decrease with respect to time). The conduction system at the first pulsation step of the present invention is shown in FIG. 9. FIG. 9A shows a rectangular wave shape, FIG. 9B shows an up slope waveform, and FIG. 9C shows a waveform including the rectangular shape after the up slope. Further, FIG. 9D shows the down slope waveform after a rectangular wave shape, FIG. 9E shows a waveform including both an up slope and down slope, and FIG. 9F shows a waveform becoming an up slope only at the first conduction.

The number of pulses of the first pulsation step is preferably made at least two or more. This is because, in the case of surface-treated hot stamped steel sheet, if not performing the pulsation two times or more, sometimes the effect of suppressing spatter cannot be obtained. The number of pulses is more preferably three or more. In general, the larger the total sheet thickness, the more the number of pulses should be increased, but the number of pulses is preferably 50 or less.

When applying the present invention to surface-treated hot stamped steel sheet treated on its surface by zinc oxide, as the first pulsation step, for example, it is preferable to repeat conduction and idling of 5.5 to 12 kA at 8.3 to 20 msec (0.5 to 1 cycle at 50 Hz or 60 Hz) three to 25 times.

The resistance spot welding method of the present invention is provided with a second pulsation step after the first pulsation step. It is possible to perform the first pulsation step to expand the conduction path (corona bond) and, after that, perform the second pulsation step to enlarge the nugget size.

The second pulsation step makes the current a pulsation form (pulse shape) and thereby gently promotes the heat generation of the steel sheet. In addition, it is possible to cause the contacting surfaces to vibrate by heat expansion and contraction, so it is possible to effectively break the high melting point oxide layer. Due to this, it is possible to form a plurality of conduction points (regions where current actually flows) between the electrodes and steel sheets and at the contact interface between one steel sheet and another steel sheet and possible to suppress the rise of the current density at the contact interface and suppress sudden nugget growth. Due to these actions, it is possible to broaden the suitable current range (current range of second conduction not causing spatter and giving $4\sqrt{t}$ or more nugget) to 1.5 kA or more without causing inner spatter and outer spatter up to a high current value.

In the second pulsation step, to sufficiently enlarge the nugget size, it is preferable to increase the minimum weld current in the second pulsation step over the maximum weld current in the first pulsation step. As explained above, on an actual mass production line, sometimes various external factors cause the desired nugget size to be unable to be obtained even if performing the second pulsation by a current value evaluated at the test piece level of the lower limit current or more. However, by setting the minimum weld current at the second pulsation step higher than the maximum weld current at the first pulsation step, it becomes possible to more stably expand the nugget size. The minimum weld current at the second pulsation step is preferably higher than the maximum weld current at the first pulsation step by 0.5 kA or more.

The conduction time per pulse in the second pulsation step is preferably 5 to 60 msec. If the conduction time is less than 5 msec, the heating time becomes short and the heat generation is not sufficient, while if over 60 msec, the heating time is too long and the rate of occurrence of outer spatter and inner spatter is liable to rise. The conduction time is more preferably 15 msec or more. Further, the conduction time is more preferably 45 msec or less, still more preferably 25 msec or less.

The weld current in the second pulsation step is preferably 5.0 to 16.0 kA. Normally, if the conduction time in a pulsation increases, the upper limit current falls. The weld current is preferably suitably adjusted so that spatter does not occur in the range of 5.0 to 16.0 kA from the balance with the conduction time. The weld current is preferably set to a range of $I_2$-0.3 kA or less when making the upper limit current in the second pulsation step $I_2$ (kA). Further, to simplify the setting of the current control apparatus of the spot welding machine, it is preferable to set the weld current in the first pulsation step at a constant value.

The conduction idle time in the second pulsation step is preferably 5 to 60 msec except at the end. If the idle time is less than 5 msec, the idling becomes short and cooling is insufficient so inner spatter and outer spatter are liable to occur. On the other hand, if the idle time is over 60 msec, the cooling efficiency becomes too great and expansion of the nugget size is liable to become difficult. The idle time is preferably 45 msec or more, more preferably 25 msec or less.

The conduction idle time between the first pulsation step and the second pulsation step is preferably 5 to 120 msec. If this idle time is less than 5 msec, a large heat generation occurs at the time of the second pulsation step. Spatter occurs even with a low current value. On the other hand, if this idle time is over 120 msec, the nugget is cooled, the lower limit current for obtaining the target nugget size rises in the second pulsation step, and, as a result, the suitable current range becomes narrower. The idle time between the steps is preferably 10 msec or more, more preferably 15 msec or more. Further, the idle time between these steps is preferably 60 msec or less, more preferably 50 msec or less. Note that, when there is a pulsation step following the second pulsation step, the idle time between the second and third pulsation steps is not particularly limited.

It is preferable to make the number of pulses in the second pulsation step at least three times or more. This is because if three times or less, sometimes the effect of enlargement of the nugget size cannot sufficiently be explained. More preferably, it is six times or more. In general, the larger the total sheet thickness, the more the number of pulses should be increased, but even if causing pulsation over 50 times, the effect tends to be saturated, so the number of pulses is preferably 50 times or less.

If dealing with hot stamped steel sheet or another high strength material, after the second pulsation step, it is also possible to perform a further consecutive conduction or pulsation after the second pulsation step. By performing further conduction after the second pulsation step, the solidification segregation of phosphorus in the nugget is eased and the nugget is made a tempered martensite structure, so the merits are obtained that the toughness of the nugget is improved and the strength of the spot welded joint can be improved.

Figure 10:
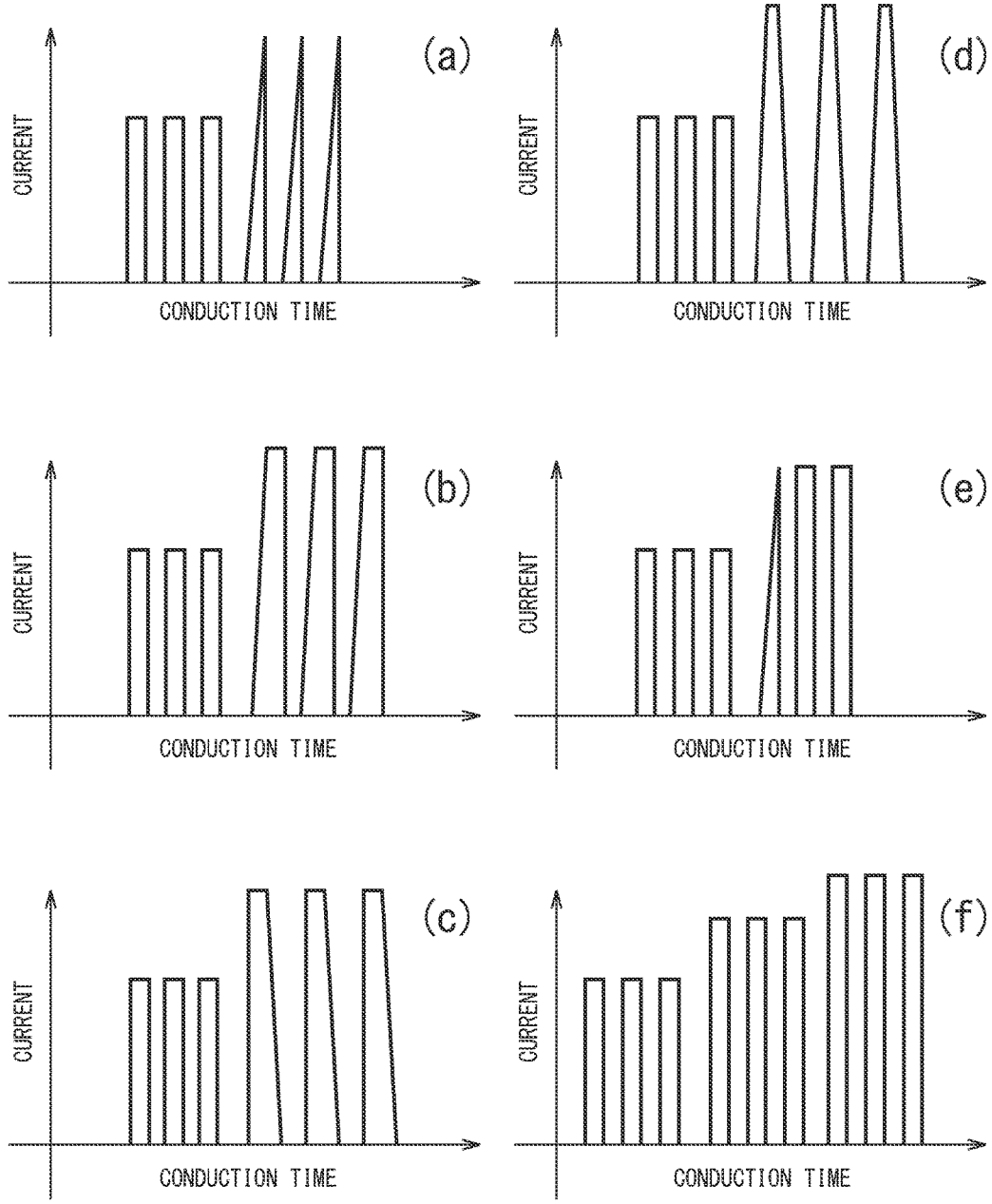
FIG. 10 is an explanatory view schematically showing a conduction system in the second pulsation step of the present invention.

The conduction system in the second pulsation step of the present invention is shown in FIG. 10. FIG. 10A uses an up slope in the second pulsation, while FIG. 10B uses a rectangular wave shape after the up slope. Further, FIG. 10C is a waveform including a down slope after the rectangular wave shape and the up slope and down slope of FIG. 10D. Furthermore, FIG. 10E is a waveform of an up slope only at the start of the second pulsation. FIG. 10F is a view showing a pattern of further pulsation conduction after the second pulsation.

The resistance spot welding method according to the present invention may be further provided with a holding step of not running current, but using the electrodes to press against the steel sheets after the first pulsation step and second pulsation step. By providing the holding step, it is possible to reduce solidification cracking in the nugget. The holding time when providing a holding step is not particularly limited, but if the holding time is too long, it leads to an increase in the tact time, so 300 msec or less is preferable.

Below, examples will be used to more specifically explain the present invention, but the present invention is not limited to these examples.

EXAMPLE 1

Using an air pressure type inverter DC spot welding machine provided with a DR type electrode (aluminum dispersed copper) with a tip diameter of 6 mm and a tip R40 mm, two thickness 1.0 mm 1500 MPa class furnace heated ZnO-coated Al-plated hot stamped steel sheets were superposed and welded by resistance spot welding. The shape of the test piece on which the resistance spot welding is performed was made a strip of a width of 30 mm and length of 100 mm. Note that, the ZnO-coated Al-plated hot stamped steel sheet used in the present embodiment was fabricated by the following method.

Using thickness 1.0 mm cold rolled steel sheet, the Sendzimir method was used for Al plating. The annealing temperature at this time was about 800° C. The Al-plating bath contained Si: 9% and also contained Fe eluted from the steel strip. The amount of plating deposition was adjusted by the gas wiping method to adjust it to a single-sided 40 g/m². To adjust the surface roughness of the Al-plating layer, water was sprayed at the time of cooling after plating. After cooling the Al plated steel sheet, a treatment solution was coated by a roll coater and the sheet was baked at about 80° C. The treatment solution was comprised of Nanotek Slurry made by C.I. Kasei based on the ZnO of which a binder constituted by water soluble urethane resin was added to a maximum 30% in solid content and carbon black for coloring was added to a maximum 10% in solid content. The amount of deposition was measured as the amount of Zn and made 0.8 g/m². The thus produced steel sheet was furnace heated at 900° C. for 5 minutes (heated in air atmosphere), then quenched in a water-cooled mold to obtain a test material. The welding method is shown in Table 1. Note that, the pressing forces in the first pulsation step and second pulsation step were made constant values (350 kgf).

After performing the first pulsation step at the current value shown in Table 1, the current value in the second pulsation step was changed and the nugget size and state of occurrence of spatter were investigated. The weld currents in the first pulsation step and the second pulsation step were respectively made constant values. The suitable current ranges of the second pulsation step at the different test numbers are shown in Table 2.

As will be understood from Table 2, the invention examples enable the upper limit currents to be raised in the second pulsation step even when superposing ZnO-coated Al-plated hot stamped steel sheets. A broad suitable current range over 1.5 kA, broader than the comparative example of the single-stage conduction not having a pulsation step, can be obtained at the test piece level. Due to this, by setting the current value of the second pulsation step to a value of the 4√t current +1.5 kA to the spatter current, spatter will not occur even when welding actual parts and even if there is disturbance due to shunting and wear of electrodes, it is possible to stably secure a spot welded part with a nugget size of 4√t or more. On the other hand, in the comparative examples, if setting the current to 4√tcurrent +1.5 kA, spatter is caused.

EXAMPLE 2

Using an air pressure type inverter DC spot welding machine provided with a DR type electrode (aluminum dispersed copper) with a tip diameter of 6 mm and a tip R40 mm, thickness 0.7 mm 270 MPa class GA plated steel sheet, thickness 1.0 mm 1500 MPa class furnace heated ZnO-coated Al-plated hot stamped steel sheet, and thickness 1.2 mm 440 MPa class nonplated steel sheet were superposed and welded by resistance spot welding. The shape of the test piece in resistance spot welding was made a strip shape of a width of 30 mm and a length of 100 mm. Note that, the ZnO film-coated Al-plated hot stamped steel sheet was fabricated by the same method as in Example 1. The welding method is shown in Table 2. Note that, the pressing force was made a constant value (350 kgf) in the first pulsation step and second pulsation step.

In the same way as Example 1, after performing the first pulsation step at the current value shown in Table 1, the current value at the second pulsation step was changed to investigate the nugget size and the state of occurrence of spatter. The weld currents at the first pulsation step and second pulsation step were respectively made constant values. The suitable current ranges in the second pulsation steps in the test numbers are shown in Table 3.

As will be understood from Table 3, the invention examples can raise the upper limit current at the second pulsation step, so it is possible to obtain a broader suitable current range compared with the comparative examples having no pulsation step and performing single stage conduction.

The present invention enables a broad suitable current range over 2.0 kA at the test piece level even with a combination of sheets envisioning resistance spot welding of three superposed sheets around a door opening such as roof rails, B-pillars, side seals, etc. of a car. Due to this, in the present invention, by setting the current value of the second pulsation step to a value of the 4√t current +1.5 kA to the spatter current, spatter will not occur even when welding actual parts and even if there is disturbance due to shunting and wear of electrodes, it is possible to stably secure a spot welded part with a nugget size of 4√t or more. On the other hand, in the comparative examples, if setting the current to 4√tcurrent +1.5 kA, spatter is caused.

EXAMPLE 3

Using a servo pressing type inverter DC spot welding machine provided with a DR type electrode (chrome copper)

with a tip diameter of 6 mm and a tip R40 mm, two thickness 1.6 mm 1500 MPa class GA-plated hot stamped steel sheets (amount of plating deposition before hot stamping: 55 g/m² per side, heating conditions: 900° C., 4 minutes, furnace heating) were superposed and welded by resistance spot welding. The welding method is shown in Table 3. The shape of the test piece in the resistance spot welding is made a strip of a width of 30 mm and a length of 100 mm. Note that, the pressing force is a constant value (350 kg) in the first pulsation step and second pulsation step.

In the same way as Example 1, the inventors performed the first pulsation step at the current value shown in Table 1, then changed the current value in the second pulsation step and investigated the nugget size and state of occurrence of spatter. The weld currents in the first pulsation step and second pulsation step are respectively made constant values. The suitable current ranges of the second pulsation step at the different test numbers are shown in Table 4.

As will be understood from Table 4, the invention examples enable the upper limit current in the second pulsation step to be raised, so it is possible to obtain a broad 1.5 kA or more suitable current range at the test piece level even compared with the comparative examples which have no pulsation step and perform a single stage of conduction. Due to this, in the present invention, by setting the current value of the second pulsation step to 4√tcurrent +1.5 kA to the spatter current, spatter will not occur even when welding actual parts and even if there is disturbance due to shunting and wear of electrodes, it is possible to stably secure a spot welded part with a nugget size of 4√t or more. On the other hand, in the comparative examples, if setting the current to 4√tcurrent +1.5 kA, spatter is caused.

TABLE 2

| Test no. | 4√t current (kA) | Spatter current (kA) | Suitable current range (kA) | Weld current (kA) | Remarks | |
|---|---|---|---|---|---|---|
| 1 | 4.5 | 4.8 | 0.3 | 6.0 | Spatter | Comp. ex. |
| 2 | 6.0 | 8.2 | 2.2 | 8.0 | No spatter | Inv. ex. |
| 3 | 5.0 | 8.8 | 3.8 | 7.0 | No spatter | |
| 4 | 5.5 | 8.5 | 3.0 | 7.0 | No spatter | |
| 5 | 5.8 | 8.8 | 3.0 | 7.3 | No spatter | |
| 6 | 5.4 | 8.8 | 3.4 | 6.9 | No spatter | |
| 7 | 5.3 | 8.5 | 3.2 | 6.8 | No spatter | |
| 8 | 5.5 | 8.8 | 3.3 | 7.0 | No spatter | |
| 9 | 5.3 | 7.3 | 2.0 | 6.8 | No spatter | |
| 10 | 5.3 | 7.0 | 1.7 | 6.8 | No spatter | |
| 11 | 5.5 | 7.5 | 2.0 | 7.0 | No spatter | |
| 12 | 5.5 | 7.5 | 2.0 | 7.0 | No spatter | |
| 13 | 6.0 | 9.0 | 3.0 | 7.5 | No spatter | |
| 14 | 5.5 | 9.5 | 4.0 | 7.0 | No spatter | |
| 15 | 5.5 | 8.3 | 2.8 | 7.0 | No spatter | |
| 16 | 5.3 | 8.0 | 2.7 | 6.8 | No spatter | |
| 17 | 5.3 | 6.3 | 1.0 | 6.8 | Spatter | Comp. ex. |

TABLE 3

| Test no. | 4√t current (kA) | Spatter current (kA) | Suitable current range (kA) | Weld current (kA) | Remarks | |
|---|---|---|---|---|---|---|
| 1 | 6.5 | 7.5 | 1.0 | 8.0 | Spatter | Comp. ex. |
| 2 | 6.8 | 9.0 | 2.2 | 8.3 | No spatter | Inv. ex. |

TABLE 1

| | First pulsation step | | | | | | Idling time | Second pulsation step | | | | | |
|---|---|---|---|---|---|---|---|---|---|---|---|---|---|
| | | Conduction time | | | | | | | Conduction time | | | | | |
| Test no. | Weld current (kA) | Up slope (ms) | Constant current (ms) | Down slope (ms) | Re-marks | Idling time (ms) | No. of pulses | between pulsation steps (ms) | Up slope (ms) | Constant current (ms) | Down slope (ms) | Idling time (ms) | No. of pulses | Re-marks |
| 1 | — | — | — | — | — | — | — | — | — | 333 | — | — | 1 | Comp. ex. |
| 2 | 7.5 | 16.6 | — | — | — | 16.6 | 2 | 16.6 | — | 16.6 | — | 16.6 | 9 | |
| 3 | 6.5 | 16.6 | — | — | — | 16.6 | 9 | 16.6 | — | 16.6 | — | 16.6 | 9 | |
| 4 | 5.5 | 33.3 | — | — | — | 16.6 | 7 | 16.6 | — | 16.6 | — | 16.6 | 9 | |
| 5 | 5.5 | 16.6 | — | — | — | 16.6 | 7 | 16.6 | — | 16.6 | — | 16.6 | 9 | |
| 6 | 5.5 | 16.6 | 16.6 | — | — | 16.6 | 7 | 16.6 | — | 16.6 | — | 16.6 | 9 | |
| 7 | 6.5 | 16.6 | 16.6 | — | Up slope only once | 16.6 | 7 | 16.6 | — | 16.6 | — | 16.6 | 9 | |
| 8 | 6.5 | — | 16.6 | — | | 16.6 | 7 | 16.6 | | 16.6 | | 16.6 | 9 | |
| 9 | 6.5 | — | 16.6 | — | | 16.6 | 7 | 16.6 | | 33.3 | | 16.6 | 9 | |
| 10 | 6.5 | — | 16.6 | — | | 16.6 | 7 | 16.6 | | 50.0 | | 33.3 | 9 | |
| 11 | 6.5 | — | 16.6 | — | | 16.6 | 7 | 16.6 | 16.6 | 16.6 | | 16.6 | 9 | |
| 12 | 6.5 | — | 16.6 | — | | 16.6 | 7 | 16.6 | | 16.6 | 16.6 | 16.6 | 9 | |
| 13 | 6.5 | — | 16.6 | — | | 16.6 | 7 | 16.6 | | 16.6 | | 16.6 | 4 | |
| 14 | 6.5 | — | 16.6 | — | | 16.6 | 7 | 116 | | 16.6 | | 16.6 | 9 | |
| 15 | 6.5 | — | 5.0 | — | | 5.0 | 23 | 16.6 | | 5.0 | | 5.0 | 30 | |
| 16 | 6.5 | — | 10.0 | — | — | 5.0 | 13 | 5.0 | — | 10.0 | — | 5.0 | 15 | |
| 17 | First step: 6.1 kA-200 ms, second step: 3.7 kA-150 ms | | | | | | | | Third step: 300 ms | | | | | Comp. ex. |

TABLE 3-continued

| Test no. | Results | | | | |
|---|---|---|---|---|---|
| | 4√t current (kA) | Spatter current (kA) | Suitable current range (kA) | Weld current (kA) | Remarks |
| 3 | 6.3 | 11.0 | 4.7 | 7.8 | No spatter |
| 4 | 6.3 | 10.5 | 4.2 | 7.8 | No spatter |
| 5 | 6.5 | 10.8 | 4.3 | 8.0 | No spatter |
| 6 | 6.5 | 10.8 | 4.3 | 8.0 | No spatter |
| 7 | 6.5 | 11.0 | 4.5 | 8.0 | No spatter |
| 8 | 6.5 | 11.2 | 4.7 | 8.0 | No spatter |
| 9 | 6.5 | 9.5 | 3.0 | 8.0 | No spatter |
| 10 | 6.3 | 8.5 | 2.2 | 7.8 | No spatter |
| 11 | 6.5 | 9.5 | 3.0 | 8.0 | No spatter |
| 12 | 6.5 | 9.8 | 3.3 | 8.0 | No spatter |
| 13 | 7.0 | 9.8 | 2.8 | 8.5 | No spatter |
| 14 | 7.0 | 10.3 | 3.3 | 8.5 | No spatter |
| 15 | 6.5 | 10.3 | 3.8 | 8.0 | No spatter |
| 16 | 6.5 | 10.0 | 3.5 | 8.0 | No spatter |
| 17 | 6.5 | 7.8 | 1.3 | 8.0 | Spatter  Comp. ex. |

INDUSTRIAL APPLICABILITY

According to the present invention, in resistance spot welding of superposed high tensile steel sheets, it is possible to suppress the occurrence of both outer spatter and inner spatter while enlarging the nugget size in resistance spot welding even if using an inverter DC power supply. Therefore, if using the resistance spot welding method according to the present invention, it becomes possible to efficiently and stably perform resistance spot welding even with steel sheet where spatter easily occurs such as surface-treated hot stamped steel sheet.

Further, according to the resistance spot welding method according to the present invention, it is possible to improve the quality of appearance of a the side panels and other parts of a car body by suppressing the occurrence of spatter. Further, it is possible to prevent spatter from sticking to the moving parts of the robot and therefore improve the operating rate of the robot. Further, it is possible to eliminate later processes accompanying the occurrence of spatter such as deburring, so it is possible to improve the work efficiency.

The invention claimed is:

1. A resistance spot welding method welding a plurality of steel sheets including a high tensile steel sheet superposed, in which said resistance spot welding method,
the conduction system is pulsation conduction using an inverter DC welding power supply, and,
in a plurality of current pulses forming the pulsation conduction,
at respective current pulses, a conduction time, intervals of the current pulses defined as a conduction idle time, and weld currents applied by the current pulses are variably controlled,
wherein the resistance spot welding method has a plurality of pulsation steps of a group of current pulses by which relationship between said conduction time and said conduction idle time and said weld current is expressed uniformly in a consecutive plurality of said current pulses, and
wherein an initial pulsation step of first pulsation step and a succeeding second pulsation step, a minimum weld current at said second pulsation step is higher than a maximum weld current at said first pulsation step.

2. The resistance spot welding method according to claim 1 wherein, in said first pulsation step, there are two or more current pulses, a conduction time of said current pulse is respectively 5 to 60 msec, and a conduction idle time is 5 to 60 msec,
in said second pulsation step, there are three or more current pulses, a conduction time of a current pulse is respectively 5 to 60 msec, and a conduction idle time is 5 to 60 msec, and
a conduction idle time between said first pulsation step and said second pulsation step is 5 to 120 msec.

3. The resistance spot welding method according to claim 1 wherein a weld current at said first pulsation step is 5.0 to 14.0 kA, while a weld current at said second pulsation step is 5.0 kA to 16.0 kA.

4. The resistance spot welding method according to claim 1 wherein a minimum weld current at said second pulsation step is 0.5 kA or more higher than a maximum weld current at said first pulsation step.

5. The resistance spot welding method according to claim 1 wherein a weld current at said first pulsation step is a constant value, and a weld current at said second pulsation step is a constant value.

6. The resistance spot welding method according to claim 1 wherein a surface of said high tensile steel sheet is covered by a zinc-based coating film or an aluminum-based coating film.

7. The resistance spot welding method according to claim 1 wherein said high tensile steel sheet is a hot stamped steel sheet.

8. The resistance spot welding method according to claim 2 wherein a weld current at said first pulsation step is 5.0 to 14.0 kA, while a weld current at said second pulsation step is 5.0 kA to 16.0 kA.

9. The resistance spot welding method according to claim 2 wherein a minimum weld current at said second pulsation step is 0.5 kA or more higher than a maximum weld current at said first pulsation step.

10. The resistance spot welding method according to claim 3 wherein a minimum weld current at said second pulsation step is 0.5 kA or more higher than a maximum weld current at said first pulsation step.

11. The resistance spot welding method according to claim 2 wherein a weld current at said first pulsation step is a constant value, and a weld current at said second pulsation step is a constant value.

12. The resistance spot welding method according to claim 3 wherein a weld current at said first pulsation step is a constant value, and a weld current at said second pulsation step is a constant value.

13. The resistance spot welding method according to claim 4 wherein a weld current at said first pulsation step is a constant value, and a weld current at said second pulsation step is a constant value.

14. The resistance spot welding method according to claim 1 wherein a surface of said high tensile steel sheet is covered by a zinc-based coating film or an aluminum-based coating film.

15. The resistance spot welding method according to claim 2 wherein a surface of said high tensile steel sheet is covered by a zinc-based coating film or an aluminum-based coating film.

16. The resistance spot welding method according to claim 3 wherein a surface of said high tensile steel sheet is covered by a zinc-based coating film or an aluminum-based coating film.

17. The resistance spot welding method according to claim 4 wherein a surface of said high tensile steel sheet is covered by a zinc-based coating film or an aluminum-based coating film.

18. The resistance spot welding method according to claim 1,
- wherein the plurality of consecutive pulses are constant in conduction time and idle time and the weld current of a pulse becomes a function of time.

* * * * *